April 20, 1937.  C. V. JOHNSON  2,077,935
SHOCK ABSORBING STRUT
Filed Nov. 22, 1932
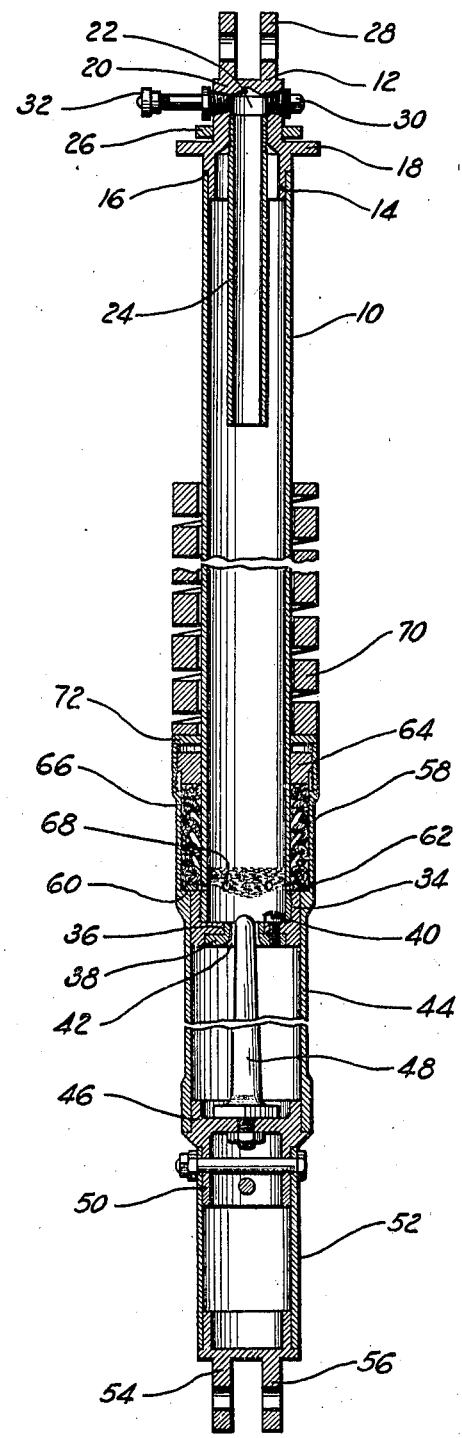
INVENTOR.
CARL V JOHNSON
BY
ATTORNEY Patented Apr. 20, 1937

2,077,935

UNITED STATES PATENT OFFICE 2,077,935

SHOCK ABSORBING STRUT

Carl V. Johnson, South Bend, Ind., assignor to Bendix Aviation Corporation, South Bend, Ind., a corporation of Delaware Application November 22, 1932, Serial No. 643,925

8 Claims. (Cl. 267—64)

This invention relates to shock absorbers and more particularly to shock absorbing struts for aircraft.

It has been found that shock absorbing struts of the hydraulic pneumatic type for aeroplanes using hydraulic fluid and air or gas under relatively high pressure and other types of shock absorbing struts using compressed air taxiing springs permit in some types of installation excessive travel and cause one of the wings of the plane to dip or drop when turning the plane while taxiing.

It has also been found that in hydraulic shock absorbing struts instances have occurred on the expansion stroke of the strut where air has been drawn in past the packing causing the fluid in the strut to remain above the piston, accordingly on the compression stroke of the strut the piston meets with practically no resistance for the first part of the stroke since there is no fluid to be forced through the metering orifice.

The present invention aims to overcome these objections by using a taxiing unit having a limited deflection such as a steel spring and by filling the strut above the hydraulic fluid with air or gas at any predetermined pressure up to ordinary line pressure, i. e., 80 to 120 pounds. This is found to be sufficient pressure to prevent drawing air in back of the head of the piston since it will be only under atmospheric pressure of approximately fifteen pounds per square inch. This causes the fluid to return upon the expansion stroke of the strut through the metering orifice into the cylinder below the head of the piston. It is, of course, understood that the effect of this relatively light pressure of air or gas on the energy absorption capacity is small, yet this may be easily taken care of by modifying the size of the metering orifice.

It is to be pointed out that usually in this type of strut the diameter of the strut above the fluid is small, hence the added resistance due to this air pressure is negligible in its effect on absorption of energy under taxiing or impact. Further, no limitation is placed on volumetric relations of the air chamber between fully extended and compressed, as in types making use of the pneumatic feature for taxiing or energy absorption. The purpose of the compressed air is to insure return of fluid below piston and to prevent air pockets being formed in this place on the expansion stroke.

Another object of the invention is to provide a shock absorbing strut of the hydraulic type having means for indicating that the strut is filled with fluid to the right level.

An additional object of the invention is to provide a shock absorbing strut which will be simple and inexpensive in structure, highly efficient in use, positive in action, durable in service, and of a general improvement in the art.

Other objects and structural details will be apparent from the subjoined description taken in connection with the drawing forming a part of this specification and in which:

The single figure is a comprehensive view largely in section and partly broken away illustrating the various parts that go to make up the present invention.

Referring to the drawing for more specific details of the invention, 10 represents a cylindrical casing or hollow piston rod closed at one end as by a cap 12, having a sleeve 14 fitted snugly into the casing. The sleeve is provided with a shoulder 16 for the reception of the extreme end of the casing, and the cap is welded or otherwise secured in position.

The cap has a flange 18, the object of which will hereinafter appear, and a bonnet 20 having a recess 22 concentrically disposed to the sleeve 14, and threaded in the recess is a cylinder 24 supported concentrically within the cylinder 10. The bonnet is externally threaded for the reception of a nut 26 adapted to secure a streamline fairing, not shown, against the flange 18, and formed on the top of the bonnet is a clevis 28 which provides suitable means for attaching the strut to the fuselage of the aeroplane.

As shown, the bonnet of the cap is provided with diametral bore. This bore has threaded in one end thereof a filling plug 30, and threaded in the other end of the bore is an air valve 32. Because of this structure the filling plug and air valve are readily accessible. Furthermore, the location of these elements is such that all tendency to weaken the structure by drilling apertures in the body of the strut is avoided.

The other end of the cylinder or piston rod has threaded thereon a piston head 34 having a greater diameter than the cylinder. The piston head has an axial double diametral bore 36 in which is fitted a case-hardened plate 38 secured against displacement as by screws 40 threaded through the head of the piston and into the plate. The plate 38 is provided with an orifice 42 concentric to the head of the piston and tapering in cross section from the face of the piston head to the back thereof.

The piston is positioned for reciprocation in a cylinder 44 closed at one end by a plug 46 supporting a metering pin 48 adaptable for cooperation with the orifice 42. The plug 46 has formed integral therewith a sleeve 50 to which is suitably secured one end of an extension member 52, the other end of which has suitably secured thereto a cap 54 on which is formed a clevis 56 for attaching the strut to the axle of an aeroplane.

The cylinder 44 has a portion of increased diameter providing a packing chamber 58. The inner end of this chamber has formed therein a shoulder 60 on which is normally seated a slidably movable packing ring 62, the inner periphery of which engages the skirt of the piston head when the strut is in full extended position. The outer end of the packing chamber has threaded therein a packing ring 64, and arranged within the packing chamber between the packing rings 62 and 64 are suitable packing glands 66. The packing chamber communicates with the cylinder 10 through suitable openings 68 so that an annular space formed, on the compression stroke, back of the piston head between the piston and cylinder walls may be filled with fluid to eliminate vacuum effect and to place the packing glands under fluid pressure.

A compression spring 70 is sleeved on the casing or piston 10. One end of this spring is supported on the packing chamber 58 with a suitable bearing plate or ring 72 interposed. The other end of the spring is adapted to engage the flange 18 on the compression stroke of the strut.

The shock absorbing strut, which is shown in completely extended position, is filled with a suitable hydraulic fluid to a level above the head of the piston and with air or gas under a relatively light pressure.

To insure the proper level of fluid in the strut, fluid is admitted to the strut through the cylinder 24 in the piston 10 while the strut is under normal load. In this operation air is entrapped between the inner wall of the piston and the outer wall of the cylinder. The cylinder is filled to its top and when the strut is extended and the column of fluid gains its level the strut will contain the desired quantity of fluid.

Assuming that the strut is connected between the axle and the fuselage of an aeroplane, it will upon impact of landing cause the hydraulic fluid therein to be forced through the orifice in the head of the piston, past the metering pin into the piston cylinder above the piston head, where the air or gas will be slightly compressed by the rise of the fluid until the flange 18 engages the compression spring 70, whereupon material increase of resistance is offered by the compression spring. After the initial shock of landing the spring serves to absorb the minor shocks due to taxiing without serious dipping of the wings of the aeroplane because of its limited deflection.

During the compression stroke the hydraulic fluid is forced through openings in the wall of the piston rod into an annular chamber formed, on the compression stroke, back of the piston head between the walls of the piston rod and the chamber. This eliminates vacuum effect and places the packing glands under pressure throughout the stroke. On the return stroke of the strut the liquid is caused to return through the openings in the wall of the piston rod to the interior of the piston rod and from the interior of the piston rod through the metering orifice in the piston head to the cylinder below the piston head.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A shock absorbing strut comprising a hollow piston, a head on one end of the piston, a cap on the other end of the piston, and a cylindrical member supported solely by the cap concentrically to and within the piston, said member extending part way into the piston and having an unobstructed open lower end.

2. A shock absorbing strut comprising a hollow piston, a head on one end of the piston, a cap on the other end of the piston having a recess concentric to the piston and a diametral bore communicating with the recess, and a cylinder secured in the recess extending concentrically into the piston, said member extending part way into the piston and having an unobstructed open lower end.

3. A shock absorbing strut comprising a hollow piston, a head on one end thereof, an elongated cap on the other end thereof having a bore extending part way thereinto, a flange on the cap, and a nut threaded on the cap for cooperation with the flange and a transverse passage in the cap connecting with the bore, said passage being above the flange and nut.

4. A shock absorbing strut comprising a hollow piston, a head on one end of the piston, an elongated cap on the other end of the piston having a flange, said cap having a bore extending part way thereinto, a nut threaded on the cap for cooperation with the flange, and a clevis on the top of the cap.

5. A shock absorbing strut comprising a piston, a head on one end of the piston having a metering orifice, an elongated cap on the other end of the piston having a recess concentric to the piston and a diametral bore communicating with the recess, a flange on the cap, a nut on the cap for cooperation with the flange, a clevis on the top of the cap, and a cylindrical member supported by the cap concentrically within the piston.

6. A shock absorbing strut comprising a piston, a head on one end of the piston having a metering orifice, an elongated cap on the other end of the piston having a recess concentric to the piston and a diametral bore communicating with the recess, and a cylindrical member supported by the cap concentrically within the piston, said member having an unobstructed open lower end.

7. A shock absorbing strut comprising a cylinder having a head at its lower end carrying a metering pin and an offset portion of larger diameter at the upper end forming a packing chamber and an enlarged spring seat, a tubular piston slidable in the cylinder and carrying an orificed piston head adapted to cooperate with said pin, a cap on said piston having a flange extending radially thereof, a coil spring arranged around the piston resting on said seat and adapted to be engaged by said flange, and be compressed between the seat and flange upon compression of the strut, hydraulic fluid in the base of the strut, and means in the cap for introducing air under pressure.

8. A shock absorbing strut comprising a cylinder having a head at its lower end carrying a metering pin and an offset portion of larger diameter at the upper end forming a packing chamber and an enlarged spring seat, a tubular piston slidable in the cylinder and carrying an orificed piston head adapted to cooperate with said pin, a cap on said piston having a flange extending radially thereof, and a coil spring arranged around the piston resting on said seat and adapted to be engaged by said flange, and be compressed between the seat and flange upon compression of the strut.

CARL V. JOHNSON.